June 27, 1933.  A. E. FORSYTH  1,915,303
PNEUMATIC VEHICLE SUPPORT
Filed Dec. 24, 1928  2 Sheets-Sheet 1

Inventor
Albert E. Forsyth
By Bates, Gobrick & Teare
Attorneys

June 27, 1933.  A. E. FORSYTH  1,915,303
PNEUMATIC VEHICLE SUPPORT
Filed Dec. 24, 1928  2 Sheets-Sheet 2
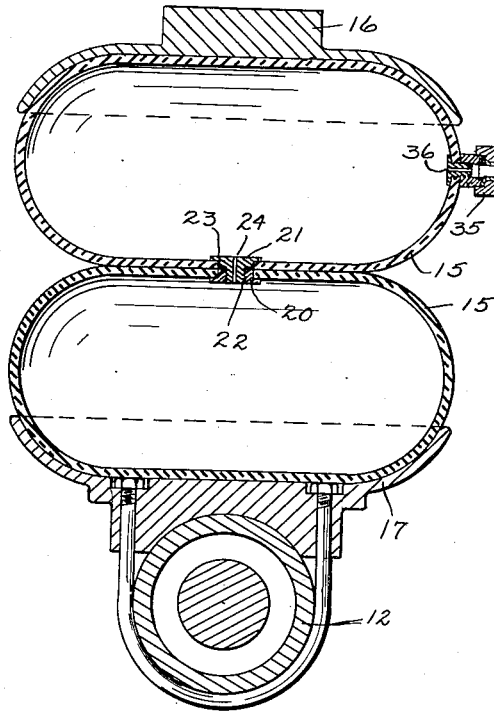
FIG.—4
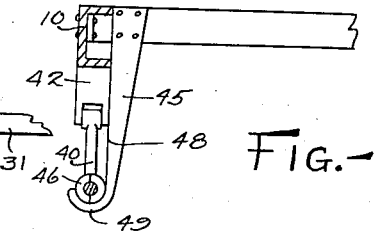
FIG.—5
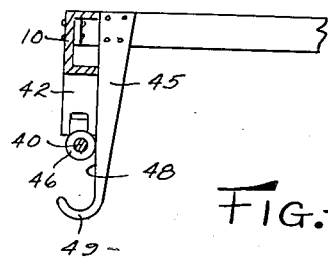
FIG.—6
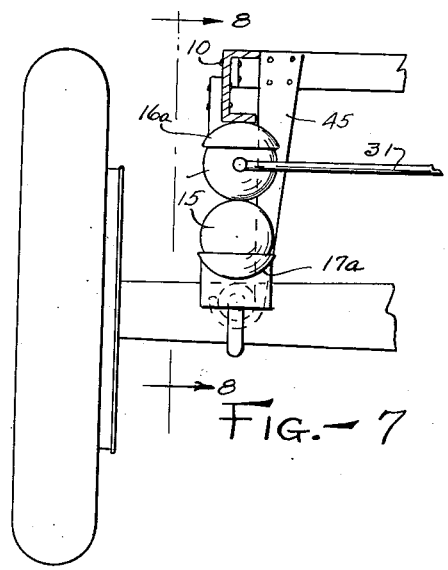
FIG.—7
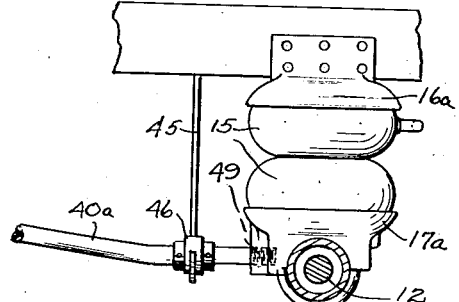
FIG.—8
Inventor
Albert E. Forsyth
By Bates, Golrick & Teare
Attorneys Patented June 27, 1933

1,915,303

UNITED STATES PATENT OFFICE

ALBERT E. FORSYTH, OF OTTAWA, ONTARIO, CANADA, ASSIGNOR TO FORSYTH AUTOMOTIVE PNEUMATIC SPRING, LIMITED, OF OTTAWA, ONTARIO, CANADA

PNEUMATIC VEHICLE SUPPORT

Application filed December 24, 1928. Serial No. 328,248.

This invention relates to pneumatic spring suspension means for vehicles, and has for one of its objects the provision of a pneumatic connection between the chassis frame and the axles, which includes inflatable containers of resilient material with provision for enabling the replacement of any container, and with provision for eliminating the absorption of all longitudinal and lateral movement of the axles with reference to the frame by the pneumatic container. In this way, the pneumatic springs operate to cushion only vertical movement of the axles with reference to the frame.

Figure 1:
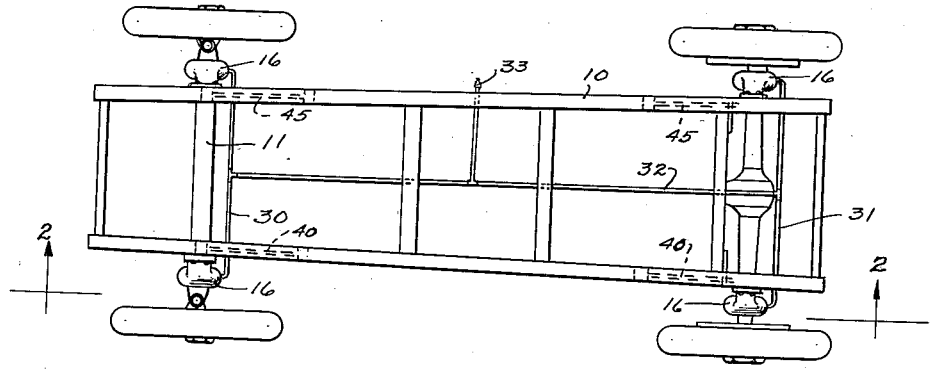
Figure 2:
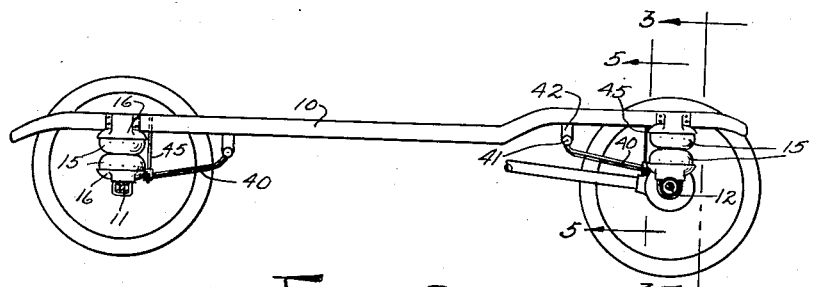
Figure 3:
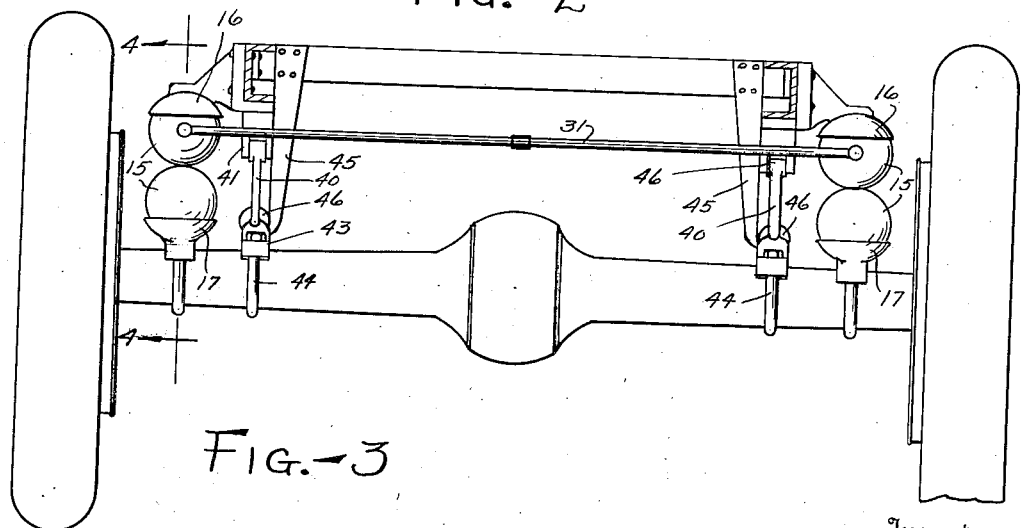

In the drawings, Fig. 1 is a top plan view of a chassis frame with pneumatic spring connections between the frame and axles embodying my invention; Fig. 2 is a section taken through the vehicle on a plane indicated by the line 2—2 in Fig. 1; Fig. 3 is a transverse section taken on the line 3—3 in Fig. 2; Fig. 4 is a section taken on an enlarged scale through the suspension means on the line 4—4 in Fig. 3; Fig. 5 is a section taken on the line 5—5 in Fig. 2; Fig. 6 is a similar section showing the relationship of the same parts when the axle occupies a different position with reference to the frame; Fig. 7 is a transverse section through the chassis frame having a modified form of my invention mounted thereon; and Fig. 8 is a section taken on the line 8—8 in Fig. 7.

Any form of chassis frame will be sufficient to illustrate my invention, and to this end, such frame is indicated in Fig. 1 at 10, as having side bars and end bars connected in the usual way. A front axle is indicated at 11 and a rear axle at 12, while resilient inflatable spring suspension elements 15 connect the frame and axles in the usual places. The connection comprises inflatable members 15 which are disposed between a downwardly facing cup-shaped member 16 which is attached to the chassis frame, and an upwardly facing cup-shaped member 17, which is fastened to the axle. As the inflatable members are alike in construction, only one unit need be described.

Each spring suspension unit comprises a plurality of inflatable members although I have shown only two members which are disposed in vertical juxtaposition with the upper member fitting into the seat 16 and a lower member fitting into the seat 17. In the preferred arrangement, these members comprise hollow rubber articles which are normally cylindrical in shape with rounded ends.

To connect the cushioning elements together, I have shown each member as having a metallic nipple vulcanized in the wall thereof with provision for connecting the nipples together. In the preferred form, the bottom element, as shown in Fig. 4, a nipple 20 has embedded in the upper part thereof while the top element has a nipple 21 embedded in the bottom part thereof. These nipples are each securely fastened to the respective elements and are arranged to be brought into threaded engagement with each other, until an airtight connection is made therebetween, against an interposed gasket 23. A passageway 24 extends through the nipple 21 and provides a pneumatic connection between the two elements.

By utilizing a threaded connection between the elements, it is possible to remove any one from the vehicle merely by jacking up the frame, disconnecting the air conduit between the cushioning units, thus enabling the elements to be bodily removed from the frame, and enabling the nipples to be disengaged merely by turning one element with reference to the other. A new element can then be substituted for the defective one or the defective one can be repaired, and then replaced.

To permit simultaneous inflation of the elements, I have shown those on the front axles as being connected by a cross-pipe 30 and those on the rear axles by a cross-pipe 31 with an interconnecting pipe 32 which is furnished with an air supply valve 33. Each cross-pipe may be connected to one of the elements as is shown in Fig. 4 by a packing nut 35 which is arranged to be threaded into a hollow nipple 36 which is embedded in an end of one of the elements, preferably the upper.

To prevent longitudinal movement of the axles with reference to the frame, I have shown a rigid strut 40 which extends between the axle and frame adjacent each cushioning element. One end of each strut is pivotally connected as at 41, to a bracket 42, which depends from the frame, while the other end may be shaped to provide a cap 43 which straddles the axles and which may be fastened by U-bolts 34 to the axles. Thus, vertical movement of the axles is permitted but longitudinal movement of the axles with reference to the frame is prevented.

To prevent lateral movement of the axles with reference to the frame, a guide bar 45 is fastened to the frame and extends downwardly alongside the strut and preferably on the inner side thereof. A roller 46 is mounted on the strut to minimize friction with the guide bar. Such roller is shown as a split roller and as being adapted to engage the vertical face 48 of the guide bar. The guide bar is shown as being curved, as at 49, adjacent the lowermost end thereof to provide an abutment against which the roller may engage to limit downward movement of the roller, and therefore of the axle, with reference to the frame. Such position is shown in Fig. 5. In Fig. 6, the roller is out of engagement with the bottom part of the guide bar and is free to move vertically with reference thereto. Since the strut restricts longitudinal movement of the axles with reference to the frame, and since the guide bar restricts lateral movement of the same, it is obvious that the pneumatic cushioning elements are free to absorb vertical stresses. It is also obvious that this arrangement of parts enables the elements to be held together in a satisfactory manner with only a relatively light connection therebetween.

In Figs. 7 and 8, I have shown a modified form of my invention wherein the cushioning elements are mounted directly beneath the side bars of the frame. To this end, the seat 16a is mounted directly beneath the bottom flange of the side bar, while the lower seat 17a is disposed in vertical alignment therewith. Since the strut is also disposed beneath the side bar, provision is made for connecting it with the seat 17a by a threaded connection 49.

In view of the foregoing description, it will be evident that I have provided a pneumatic cushioning device which may comprise a plurality of pneumatic interconnected members and that I have made provision for the removal of all load bearing stresses, excepting vertical stresses, from the pneumatic elements. It will also be evident that any one of the elements may be easily and satisfactorily replaced in an expeditious manner.

I claim:

1. In combination, a vehicle frame, an axle associated therewith, a resilient pneumatic spring suspension connection between the axle and frame, a member pivotally connected at one end of the frame and rigidly connected at the other end to the axle for preventing longitudinal movement of the axle with reference to the frame, and means carried by the frame and acting upon said member for preventing lateral movement of the axle with reference to the frame.

2. In combination, a vehicle frame, an axle therefor, pneumatic spring suspension means between the axle and frame, said means comprising a plurality of superimposed contiguous convex pneumatic bags, each having the walls thereof resilient throughout, there being a pneumatic connection between the members, said connection functioning to permit removal of one member with reference to the other.

3. In combination, a vehicle frame, an axle therefor, pneumatic cushioning means between the axle and frame, an obliquely extending member connecting the axle and frame, and a vertically extending member mounted on the frame and engaging the oblique member, said oblique and vertical members co-operating to maintain the cushioning means in operative position between the axle and frame.

4. In combination, a vehicle frame, an axle therefor, pneumatic cushioning means between the axle and frame, a strut extending longitudinally of the frame and connected with the axle, a guide bar carried by the frame and depending therefrom, a roller mounted on the strut and engaging the guide bar, said guide bar having an abutment thereon for limiting downward movement of the strut with reference to the frame.

5. In combination, two movable members disposed in vertical spaced relationship to each other and adapted to be moved toward each other, two superimposed pneumatic bags arranged in contiguous relationship and providing a spacing medium between said members, the walls of each bag being resilient and convex throughout, and means associated with each member for maintaining the associated bag in operative position.

6. In combination, two movable members disposed in vertical spaced relationship to each other and adapted to be moved toward and away from each other, a downwardly facing cup-shaped member carried by the upper member, and an upwardly facing cup-shaped member carried by the lower member, a pneumatic bag engaging each of said members, the walls of each of said bags being resilient throughout, and means for maintaining the bags in vertical operative alignment with reference to the members and to each other.

7. In combination, two movable members disposed in vertical spaced relationship to each other and adapted to be moved toward and away from each other, two superimposed pneumatic bags arranged in contiguous relationship, and providing a spacing and load transmitting medium between said members, the walls of each bag being convex and resilient throughout, a seat for each bag, each seat being rigidly mounted on one of said members, the seats serving to hold the bags in vertical operative relationship, and a resilient and convex portion of one bag acting against the resilient and convex portion of the coacting bag and transmitting load stresses from one to the other of said members.

In testimony whereof, I hereunto affix my signature.

ALBERT E. FORSYTH.